M. C. GODBE.
ORE LEACHING APPARATUS.
APPLICATION FILED DEC. 3, 1914.

1,150,263.

Patented Aug. 17, 1915.
3 SHEETS—SHEET 1.

Witnesses

M. C. Godbe
Inventor by C. A. Snow & Co.
Attorneys

M. C. GODBE.
ORE LEACHING APPARATUS.
APPLICATION FILED DEC. 3, 1914.
1,150,263.
Patented Aug. 17, 1915.
3 SHEETS—SHEET 2.
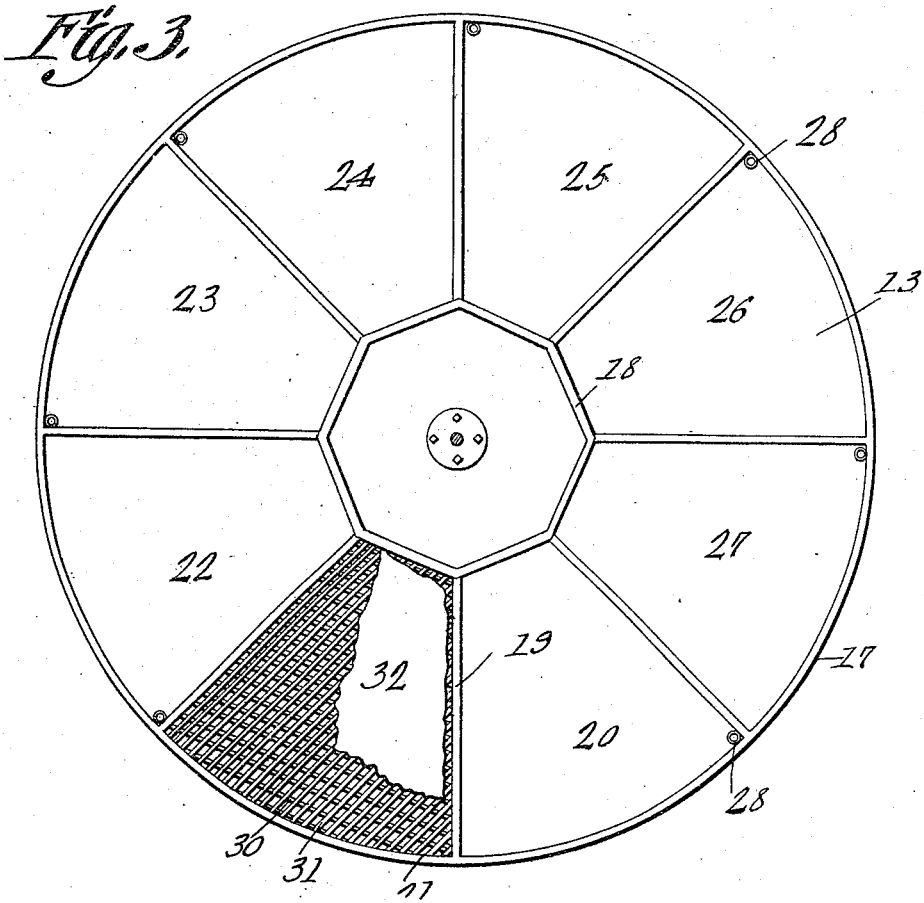
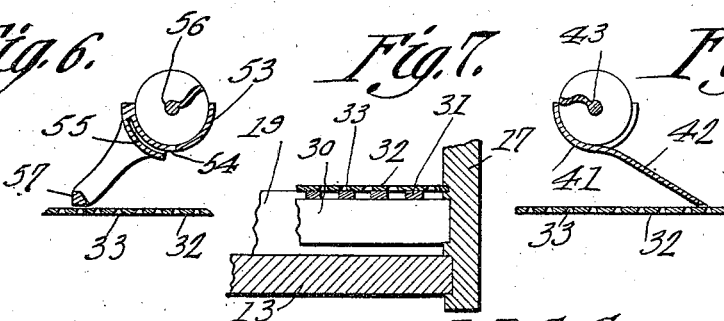

M. C. GODBE.
ORE LEACHING APPARATUS.
APPLICATION FILED DEC. 3, 1914.
1,150,263.
Patented Aug. 17, 1915.
3 SHEETS—SHEET 3.
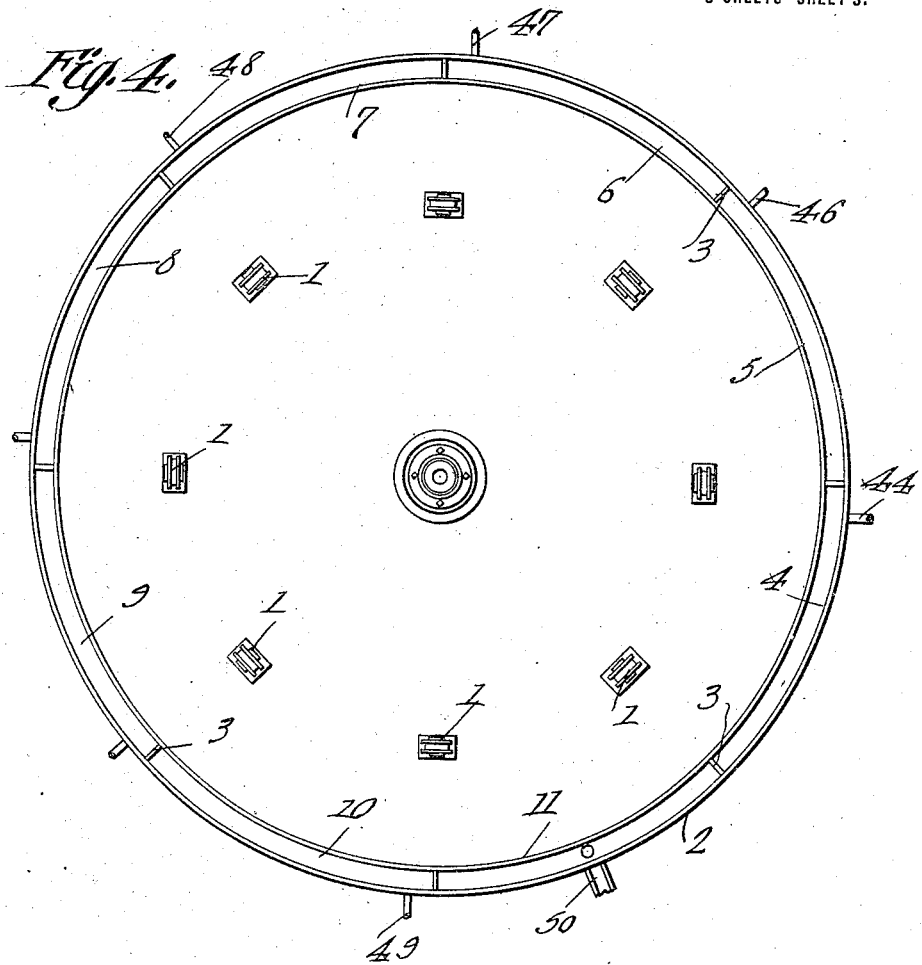
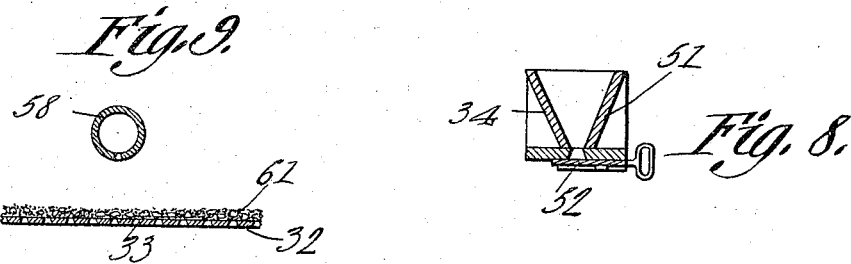
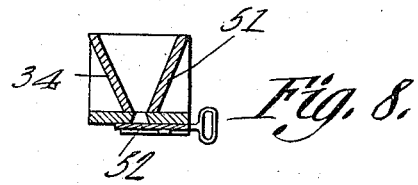
M. C. Godbe
Inventor
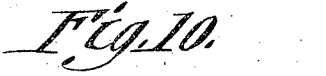

UNITED STATES PATENT OFFICE.

MURRAY C. GODBE, OF SALT LAKE CITY, UTAH.

ORE-LEACHING APPARATUS.

1,150,263.   Specification of Letters Patent.   Patented Aug. 17, 1915.

Application filed December 3, 1914. Serial No. 875,354.

*To all whom it may concern:*

Be it known that I, MURRAY C. GODBE, a citizen of the United States, residing at Salt Lake City, in the county of Salt Lake and State of Utah, have invented a new and useful Ore-Leaching Apparatus, of which the following is a specification.

This invention relates to mechanism whereby a continuous operation of leaching ores may be effected, one of the objects of the invention being to provide means whereby the ore while being treated, will pass continuously from the delivering mechanism to the discharging mechanism, thus eliminating a large amount of labor which has heretofore been necessary in order to properly leach ores, and, consequently, effecting a considerable saving in the cost of operation as well as increasing the efficiency of the mechanism.

A further object is to provide novel means for handling the solution whereby the well known and efficient principle of "countercurrent" leaching may be employed in a continuous process, the barren or strongest solution being applied to the nearly leached or finished ore and, after passing several times through the ore, being finally directed through the fresh ore while being loaded onto the apparatus.

A further object is to provide means for automatically washing the apparatus at the proper point during the operation thereof, thus to prevent the formation of any crust or cake of an impenetrable nature that might be left on the filter subsequent to the removal of the ore.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
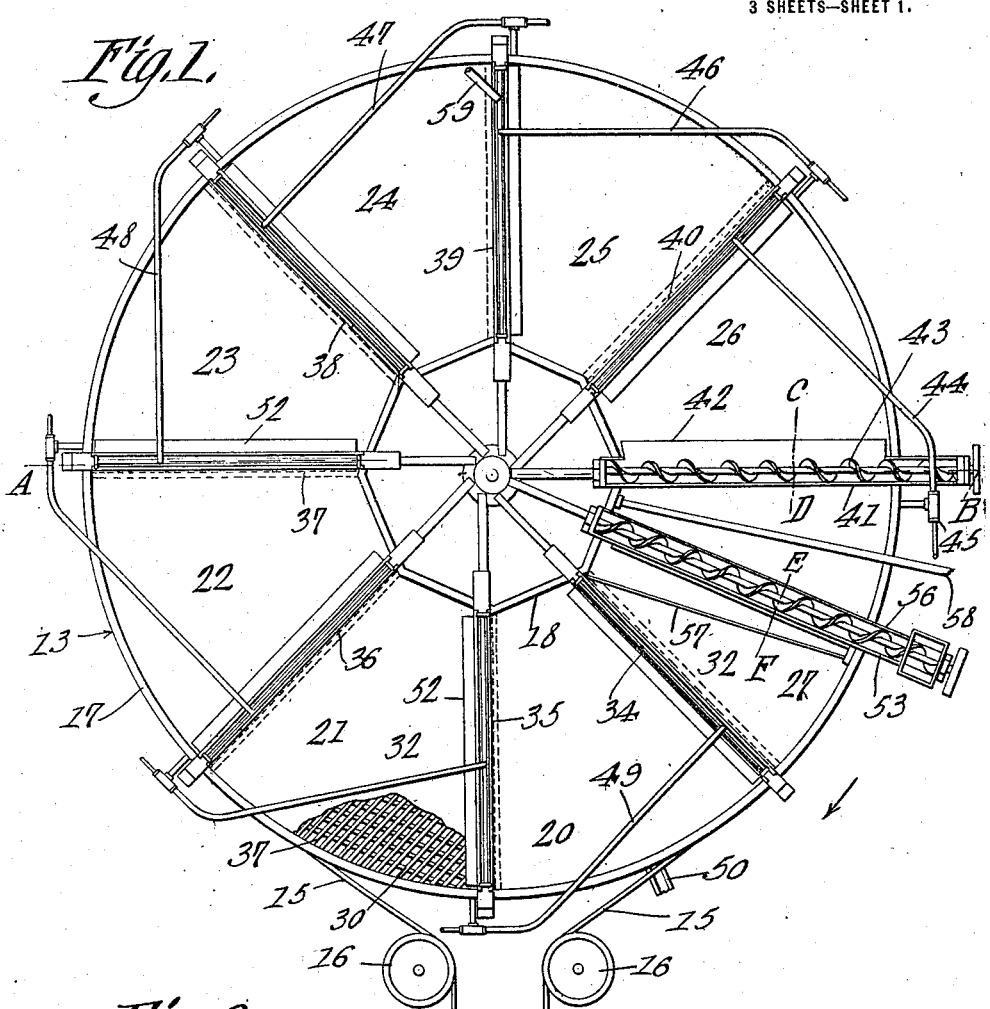
Figure 2:
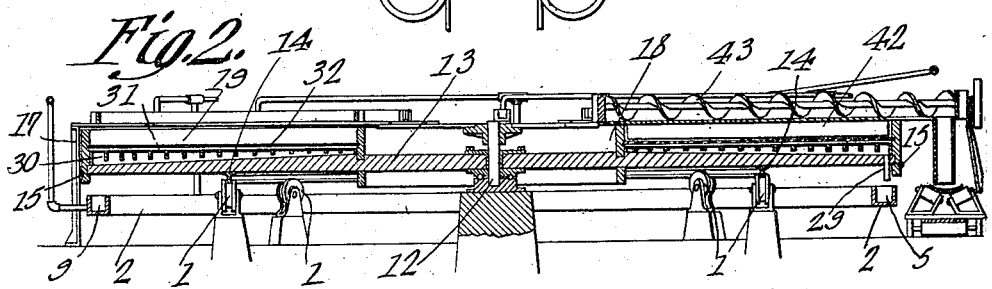

In said drawings: Figure 1 is a plan view of the apparatus, a portion of the filter being broken away to show the cellular compartment thereunder. Fig. 2 is a section on line A—B Fig. 1. Fig. 3 is a plan view of the revoluble table, all but a small portion of the filtering material being removed and the slats and partition strips being removed from all but one of the compartments of the table. Fig. 4 is a plan view of the supporting structure and the annular launder or trough adapted to be supported under the peripheral portion of the table. Fig. 5 is an enlarged section on line C—D Fig. 1. Fig. 6 is an enlarged section on line E—F Fig. 1. Fig. 7 is an enlarged vertical section through one side portion of one of the compartments in the table. Fig. 8 is an enlarged transverse section through one of the solution distributing boxes. Fig. 9 is an enlarged transverse section through the spray pipe for use in washing the filtering material. Fig. 10 is an enlarged section through a portion of a modified form of filtering structure.

Referring to the figures by characters of reference 1 designates a circular series of supporting wheels mounted upon any suitable structure and provided with grooved peripheries, this series of wheels being surrounded by a circular launder or trough 2 divided, by transverse partitions 3, into separate compartments. Any desired number of these compartments may be used and in the present instance eight of them have been illustrated, the same being numbered from 4 to 11 inclusive.

Mounted for rotation about a suitable central bearing 12 is a circular table 13 extending at its periphery over and beyond the trough or launder 2 and provided, upon its lower face, with a concentric circular rail 14 which bears downwardly upon the grooved peripheries of the wheels 1 so that the table is thus steadied during its rotation. This table can be rotated by any suitable mechanism provided for that purpose. For example, a belt 15 may be extended therearound and into engagement with guide pulleys 16. It is to be understood, however, that no importance is attached to the particular means for actuating the table. Furthermore the table can be rotated at any speed desired. In some operations it is deemed desirable to rotate it once in thirty minutes, whereas other operations require that the table rotate but once or twice every twenty-four hours.

Upstanding from the periphery of the table 13 is a rim or flange 17 and a ring or circular flange 18 likewise extends upwardly from the table adjacent and concentric with the center thereof so that a circular space is thus provided between the two flanges 17 and 18. This space is divided into non-communicating segmental compartments by partitions 19 which are radially disposed and the number of these compartments equals the number of compartments within the launder or trough 2 hereinbefore referred to.

In the drawings the separate compartments have been designated by the numerals 20 to 27 inclusive. The bottom of each of the compartments 20 to 27 inclusive, is inclined outwardly to a drain opening 28 formed in the bottom of the compartment, there being a short drain pipe 29 extending downwardly from each of these openings, all of these pipes being located directly above and adapted to discharge into the launder or trough 2 during the rotation of the table 13. Each of the compartments on the table contains a series of transversely extending cells formed by erecting parallel strips within the compartment, the said strips being spaced from the bottom of the table 13 and supporting slats 31 the upper faces of which lie in the same plane with the tops of the partitions 19. These slats and the partitions are adapted to support a filtering medium 32 which extends continuously within the circular space between the flanges 17 and 18 and over all of the compartments on the table. This filtering material can be in the form of a fabric, as shown in Figs. 1 to 7 inclusive or, if preferred, the said filtering medium can be made of wood, metal or other like strip material having apertures therein. In Fig. 10 such a filtering medium has been shown, the apertures being indicated at 33. It will be noted that these apertures increase in area in a downward direction so that should any material pass into the apertures there will be no danger of the same choking the apertures. Instead the said material can drop freely through them.

Fixedly mounted in any suitable manner above the revoluble table 13 is a series of radially disposed boxes 34 to 40 inclusive, and a discharging trough 41. These boxes and the trough bridge the space between the flanges 17 and 18 on the table and are located substantially in the same vertical planes with the radial partitions 3 in the launder or trough 2. The boxes 34 to 39 inclusive are designed to direct the leaching solution onto the contents of the revolving table, while the box 40 constitutes means for directing water onto said contents as hereinafter set forth. The trough 41 has a scraping blade or scoop 42 extending downwardly from one side thereof and throughout the width of the filtering medium, this scraper being adapted to contact with or to lie close to the surface of said medium. Any suitable means, such as a screw conveyer 43 may be disposed longitudinally within the trough 41 so as to convey from said trough any material which may be directed thereinto over the blade 42.

The compartment 4, of the launder or trough 2 and which is located under the space between the trough 41 and the box 34 has an outlet pipe 44 whereby the contents of the compartment 4 may be directed into the box 40. Any suitable means, such as an injector 45, may be employed for lifting the liquid within the pipe 44 from the compartment 4 to the box 40. Another like connection 46 is provided between the compartment 5 which is located under the space between the trough 41 and the box 40, and the box 39. The compartment 6, which is located under the space between the boxes 39 and 40, has a pipe connection 47 with the box 38 and the compartment 7, which is located beneath the space between boxes 37 and 38, communicates, through a pipe connection 48, with the box 37. This arrangement is followed throughout the extent of the apparatus, the compartment 10 having its outlet connected, by a pipe 49 to the box 34 while the compartment 11 under the space between boxes 34 and 35, has an outlet 50 through which the values are withdrawn finally.

Each of the boxes 34 to 40 inclusive can be of any form desired. For example, they can be made like elongated hoppers, as shown in Fig. 8, each hopper having an outlet opening 51 extending throughout the length thereof and provided with a slide valve or closure 52 whereby the size of the opening can be varied so as thus to control the flow of fluid through the bottom of the hopper. Obviously various other constructions might be used for regulating the discharge of liquid onto the contents of the rotating table.

Radially mounted above the space between the trough 41 and the box 34 is a trough 53 having an outlet opening 54 extending throughout the length of the bottom thereof and adapted to be partly or entirely closed by a sliding gate or valve 55. A feed screw 56 is mounted for rotation within the trough 53 and by means thereof material to be treated is fed longitudinally within the trough 53 where it will be discharged through the opening 54 and onto the filtering medium 32. A leveling strip 57 is supported at any desired distance from the top surface of the filtering medium and between the trough 53 and the box 34, this leveling strip being disposed angularly relative to the trough 53 so as to deflect laterally any material coming into contact therewith, thus to insure the proper spreading of the material over the filtering medium while said material is being leveled. A spray pipe 58 or the like is extended between the troughs 41 and 53 and above the filtering medium and is designed to direct water or other suitable cleansing fluid downwardly onto the filtering medium.

In using the present apparatus the table 13, as before stated, is rotated continuously. The ore or other material to be treated is directed into the outer end portion of the trough 53 and is conveyed by the worm or screw 56 longitudinally within the trough so that it will be discharged through the opening 54 and onto the filtering medium 32. As this material comes against the leveling strip 57, it will be spread out and brought to a predetermined level upon the filtering medium.

The barren or strong solution used in the treatment of the ore is first directed into the box 39 in any suitable manner, as through a supply pipe 58 and, as the layer of ore on the table is brought slowly under the box 39, the strong solution escaping from the box 39 flows onto the ore and thus displaces the solution previously discharged onto the ore and which displaced solution is thus drained into the compartment 6 of the launder. From this compartment the said drained solution is elevated through the pipe 47 to the box 38 where it is directed onto the ore, thereby displacing the weaker solution contained within the ore and which is drained into the compartment 7. The solution in compartment 7 is elevated to box 37 and drained onto the ore, thus displacing the weaker solution contained in the ore and which displaced solution drains into the compartment 8. The solution in compartment 8 is elevated to the box 36 and onto the ore, the solution displaced at this point draining into the compartment 9 from which it is conveyed to the box 35. The solution displaced at this point drains into the compartment 10 and is elevated to the box 34, the solution at this point being in its weakest condition and being discharged onto the ore just after it leaves the leveling strip 57.

The strong or barren solution absorbed by the ore while passing under the box 39 is displaced, while passing under the box 40, by water which is discharged from said box and which is distributed in such quantities as to completely saturate the ore, the displaced solution draining into the compartment 5 in the launder from which it is returned to the box 39 where, with an added amount of solution of the first strength, it is again sprayed onto the ore passing thereunder, thus displacing the solution which had been discharged onto the ore from the box 38. This operation is followed throughout the extent of the apparatus, it being obvious therefore that the ore, where first acted upon in the apparatus, is saturated with the weakest solution, discharged from the box 34 and which solution has already passed back and forth through the ore through the various other boxes 35 to 39 inclusive. As the ore progresses toward the trough 41 in the direction of the arrow in Fig. 1 it is met by solutions of gradually increased strength so that, when the ore reaches the last step in its movement, it is acted upon by the strongest solution in order that the best results may be obtained. This principle is what is commonly known as "counter-current" leaching and it has been possible heretofore to use it only in connection with non-continuous apparatus. It will be seen in the present case, however, that after the ore has been dumped onto the filtering medium from the trough 53, it is subjected successively to solutions of gradually increasing strengths and finally, after being acted upon by the strongest or barren solution, is scraped up by the blade or scraper 42 into the trough 41 from which it is removed by the conveyer 43 and directed into a suitable conveyer such as shown for example at 60 in Fig. 2.

Water used for displacing the barren solution while the ore is passing under the box 40 is practically completely absorbed by the ore from which the solution has been displaced and is carried out by the ore when removed from the filtering medium by the scraper 42. This water is preferably obtained by the use of a spray pipe 58 which serves to clean the surface of the filtering medium after the ore has been removed therefrom, thus preventing the formation of cakes or crusts which might interfere with the operation of the machine. This spray after passing through the filtering medium at points between the troughs 41 and 53, drains into the compartment 4 of the launder and is lifted therefrom through the pipe 44 into the box 40.

Instead of using a fabric as a filtering medium, an apertured structure such as hereinbefore referred to and which has been shown in Fig. 10, can be used. Where such a structure is used, it is designed to cover it with a coarse grade of ore as shown at 61 in Fig. 10 and to place over this coarse grade a finer grade, the coarse ore preventing the fine ore from escaping through the openings 33. Where this method is employed, the scraper 42 will be so adjusted as merely to remove the upper layer or strata of ore on the table, leaving the coarser grade constantly in position to receive and support the finer material discharged from the trough 53.

What is claimed is:—

1. Apparatus of the class described including a horizontal table mounted for continuous rotation, said table including separate non-communicating compartments and a continuous filtering medium extending over the compartments, means for feeding a layer of material onto the filtering medium, means for subjecting the moving layer of material successively to the action of a counter current of leaching solution, said solution gradually diminishing in strength toward the point where said material is fed onto the table, and means adjacent the feeding means for removing material from the filtering medium subsequent to the action thereon by the strongest portion of the solution.

2. Apparatus of the class described comprising a continuously rotating table including non-communicating compartments and a continuous filtering medium extending over the compartments, means for discharging material onto the filtering medium to form a layer thereon, means for removing the material from the filtering medium and discharging it from the machine, means for discharging a leaching solution in its barren or strongest condition onto the material adjacent the point of removal of the material and means for setting up a counter current of said solution and directing it successively onto the material up to a point adjacent the material feeding means.

3. Apparatus of the class described including a continuously rotating table having separate non-communicating compartments and a continuous filtering medium extending over the compartments, a continuous launder located below the table and divided into separate compartments, separate means fixedly mounted above the table for directing fluid onto the contents of the table, means for feeding a layer of material onto the filtering medium, means adjacent said feeding means for removing the layer of material from the filtering medium, and separate means for maintaining communication between the compartments of the launder and the respective fluid distributing means whereby, during the rotation of the table, the material supported thereby is subjected successively to the action of a leaching solution of a strength gradually increasing toward the point of removal of the material.

4. Apparatus of the class described including a table mounted for continuous rotation, said table having a plurality of non-communicating compartments and a continuous filtering medium extending over the compartments, a continuous launder beneath the table and having separate non-communicating compartments, means for draining the contents of the compartments on the table successively into the compartments in the launder, means for feeding a layer of material onto the filtering medium, means for removing said layer of material from the filtering medium, fluid distributing boxes fixedly mounted above the table and the respective compartments of the launder, and means for maintaining communication between said compartments of the launder and the fluid distributing means whereby, during the rotation of the table, the contents of said table are subjected successively to the action of a leaching fluid gradually increasing in strength toward the point of removal of the material.

5. Apparatus of the class described including a table mounted for continuous rotation, said table having a plurality of non-communicating compartments and a continuous filtering medium extending over the compartments, a continuous launder beneath the table and having separate non-communicating compartments, means for draining the contents of the compartments on the table successively into the compartments in the launder, means for feeding a layer of material onto the filtering medium, means for removing said layer of material from the filtering medium, fluid distributing boxes fixedly mounted above the table and the respective compartments of the launder, means for maintaining communication between said compartments of the launder and the fluid distributing means whereby, during the rotation of the table, the contents of said table are subjected successively to the action of a leaching fluid gradually increasing in strength toward the point of removal of the material, and means for washing the filtering material at a point between the removing means and the feeding means.

6. Apparatus of the class described including a table mounted for continuous rotation, said table having a plurality of non-communicating compartments and a continuous filtering medium extending over the compartments, a continuous launder beneath the table and having separate non-communicating compartments, means for draining the contents of the compartments on the table successively into the compartments in the launder, means for feeding a layer of material onto the filtering medium, means for removing said layer of material from the filtering medium, fluid distributing boxes fixedly mounted above the table and the respective compartments of the launder, means for maintaining communication between said compartments of the launder and the fluid distributing means whereby, during the rotation of the table, the contents of said table are subjected successively to the action of a leaching fluid gradually increasing in strength toward the point of removal of the material, means for washing the filtering material at a point between the removing means and the feeding means, and means for utilizing the washing fluid for displacing leaching fluid of the first strength from the material and saturating said material at its point of removal from the apparatus.

In testimony that I claim the foregoing as my own, I have hereto affixed my signature in the presence of two witnesses.

MURRAY C. GODBE.

Witnesses:
 IVY E. SIMPSON,
 PHILOMENA A. ROCKELLI.